United States Patent
Kobayashi et al.

(10) Patent No.: US 10,415,656 B2
(45) Date of Patent: Sep. 17, 2019

(54) WORK-MACHINE ERRONEOUS FORWARD/BACKWARD TRAVELLING OPERATION NOTIFYING DEVICE

(71) Applicant: TADANO LTD., Kagawa (JP)

(72) Inventors: Toshiaki Kobayashi, Kagawa (JP); Shingo Sakai, Kagawa (JP); Eiji Yoshida, Kagawa (JP); Koichi Morita, Kagawa (JP); Kazuhisa Onishi, Kagawa (JP)

(73) Assignee: TADANO LTD., Kagawa (JP)

( * ) Notice: Subject to any disclaimer, the term of this patent is extended or adjusted under 35 U.S.C. 154(b) by 198 days.

(21) Appl. No.: 15/571,409

(22) PCT Filed: Mar. 23, 2016

(86) PCT No.: PCT/JP2016/059207
§ 371 (c)(1),
(2) Date: Nov. 2, 2017

(87) PCT Pub. No.: WO2016/181712
PCT Pub. Date: Nov. 17, 2016

(65) Prior Publication Data
US 2019/0154092 A1    May 23, 2019

(30) Foreign Application Priority Data
May 12, 2015  (JP) .................. 2015-097404

(51) Int. Cl.
*F16D 25/12*    (2006.01)
*F16H 61/12*    (2010.01)
(Continued)

(52) U.S. Cl.
CPC ............ *F16D 25/12* (2013.01); *F16H 59/70* (2013.01); *F16H 61/12* (2013.01); *F16H 61/18* (2013.01);
(Continued)

(58) Field of Classification Search
CPC ... F16D 25/12; F16H 6/12; F16H 6/18; F16H 2059/683
See application file for complete search history.

(56) References Cited

U.S. PATENT DOCUMENTS

| 5,231,254 A | 7/1993 | Baker et al. |
| 2007/0015627 A1 | 1/2007 | Hinami et al. |

(Continued)

FOREIGN PATENT DOCUMENTS

| JP | H05-092544 U | 12/1993 |
| JP | 2004-060804 A | 2/2004 |

(Continued)

OTHER PUBLICATIONS

Jun. 14, 2016, International Search Report issued for related international application No. PCT/JP2016/059207.

(Continued)

*Primary Examiner* — Edwin A Young
(74) *Attorney, Agent, or Firm* — Paratus Law Group, PLLC (57) ABSTRACT

Provided is a work-machine erroneous forward/backward travelling operation notifying device capable of improving safety by notifying, when a travel direction inputted to an operation input unit does not conform to the condition of a transmission clutch, an operator of the non-conformance. Whether the conditions of clutches 121 to 124 conform to a travel direction inputted to a selection lever 141 is determined on the basis of a pressure Pf sensed by a first pressure sensor 133a or a pressure Pr sensed by a second pressure sensor 134a and the travelling direction inputted to the selection lever 141. When it is determined that the conditions of the clutches 121 to 124 do not conform to the travel direction inputted to the selection lever 141, a vehicle 10 is notified that an erroneous operation will occur.

5 Claims, 4 Drawing Sheets

(51) Int. Cl.
 *F16H 61/18* (2006.01)
 *F16H 59/70* (2006.01)
 *F16H 59/68* (2006.01)

(52) U.S. Cl.
 CPC ... *B60Y 2200/416* (2013.01); *F16H 2059/683* (2013.01); *F16H 2059/708* (2013.01); *F16H 2061/1264* (2013.01)

(56) References Cited

U.S. PATENT DOCUMENTS

| | | | |
|---|---|---|---|
| 2011/0112736 A1 | 5/2011 | Nakade et al. | |
| 2012/0152688 A1* | 6/2012 | Lee | F16D 48/02 192/85.63 |
| 2012/0304816 A1* | 12/2012 | Yagi | F16H 61/0021 74/665 B |
| 2014/0256507 A1* | 9/2014 | Sakamoto | B60W 10/11 477/77 |
| 2014/0303879 A1 | 10/2014 | Hyodo et al. | |

FOREIGN PATENT DOCUMENTS

| | | | |
|---|---|---|---|
| JP | 2005-315280 A | 11/2005 |
| JP | 2007-333174 A | 12/2007 |
| JP | 2013-002566 A | 1/2013 |

OTHER PUBLICATIONS

Jun. 2, 2016, International Search Opinion issued for related international application No. PCT/JP2016/059207.
Dec. 13, 2018, European Search Report issued for related EP Application No. 16792437.2.

* cited by examiner

WORK-MACHINE ERRONEOUS FORWARD/BACKWARD TRAVELLING OPERATION NOTIFYING DEVICE

CROSS REFERENCE TO PRIOR APPLICATION

This application is a National Stage Patent Application of PCT International Patent Application No. PCT/JP2016/059207 (filed on Mar. 23, 2016) under 35 U.S.C. § 371, which claims priority to Japanese Patent Application No. 2015-097404 (filed on May 12, 2015), which are all hereby incorporated by reference in their entirety.

TECHNICAL FIELD

The present invention relates to a work-machine erroneous forward/backward travelling operation notifying apparatus equipped with a transmission having a clutch that switches between forward travelling and backward travelling by hydraulic oil discharged from a hydraulic pump, such as a rough terrain crane, for example.

BACKGROUND ART

As a conventional work-machine forward/backward travelling switching apparatus, there is known the one including a transmission having a clutch that switches forward travelling or backward travelling of a travelling body by hydraulic oil supplied from a hydraulic pressure source, a forward travelling hydraulic oil flow path that allows the hydraulic oil to pass through when the clutch is set at a forward travelling side of the travelling body, and a backward travelling hydraulic oil flow path that allows the hydraulic oil to pass through when the clutch is set at a backward travelling side of the travelling body, a flow path switching mechanism that switches the flow path for the hydraulic oil supplied from a hydraulic pressure pump to a forward travelling hydraulic oil flow path side or a backward travelling hydraulic oil flow path side, and an operation input section to which an operation of causing the travelling body to travel forward or travel backward is inputted (see PTL, for example).

CITATION LIST

Patent Literature
PTL 1
Japanese Utility Model (Registration) Application Laid-Open No. 05-92544

SUMMARY OF INVENTION

Technical Problem

In a forward/backward travelling switching apparatus, the flow path switching mechanism is constructed by an electromagnetic flow path switching valve. Consequently, for example, when the flow path switching mechanism does not operate normally due to the flow path switching valve being stuck or the like, a state of the clutch of the transmission does not coincide with the travel direction which is inputted to the operation input section. In this state, there is a possibility that the travelling body travels in a different direction from the travel direction inputted to the operation input section.

An object of the present invention is to provide a work-machine erroneous forward/backward travelling operation notifying apparatus that can enhance safety by notifying a worker that a travel direction inputted to an operation input section and states of clutches of a transmission do not coincide with each other, when the travel direction inputted to the operation input section and the states of the clutches of the transmission do not coincide with each other.

Solution to Problem

In order to achieve the object, a work-machine erroneous forward/backward travelling operation notifying apparatus, includes: a transmission including a clutch that performs switching of forward travel or backward travel of a travelling body by a hydraulic oil discharged from a hydraulic pump; a forward travelling hydraulic oil flow path that allows the hydraulic oil to flow through when the clutch is set at a forward travel side of the travelling body; a backward travelling hydraulic oil flow path that allows the hydraulic oil to flow through when the clutch is set at a backward travel side of the travelling body; a flow path switching mechanism that switches a flow path for the hydraulic oil discharged from the hydraulic pump to a forward travelling hydraulic oil flow path side or a backward travelling hydraulic oil flow path side; a forward travelling pressure sensor that detects pressure in the forward travelling hydraulic oil flow path; a backward travelling pressure sensor that detects pressure in the backward travelling hydraulic oil flow path; an operation input section that inputs an operation that causes the travelling body to travel forward or travel backward; a state determination section that determines whether or not a state of the clutch coincides with a travel direction inputted to the operation input section, based on at least one of detected pressure of the forward travelling pressure sensor and detected pressure of the backward travelling pressure sensor and the travel direction inputted to the operation input section; and a notification section that notifies that an erroneous operation is to occur on the travelling body, when it is determined that the state of the clutch does not coincide with the travel direction inputted to the operation input section by the state determination section.

Thereby, it is notified that an erroneous operation is to occur on the travelling body, so that it becomes possible to cause an occupant to recognize that an erroneous operation is to occur on the travelling body before the travelling body actually starts to travel.

Advantageous Effects of Invention

According to the present invention, it becomes possible to cause the occupant to recognize that an erroneous operation is to occur on the travelling body before the travelling body actually starts to travel, so that it becomes possible to enhance safety in the travelling time of the travelling body.

DESCRIPTION OF EMBODIMENTS

FIGS. 1 to 4 illustrate an embodiment of the present invention.

Figure 1:
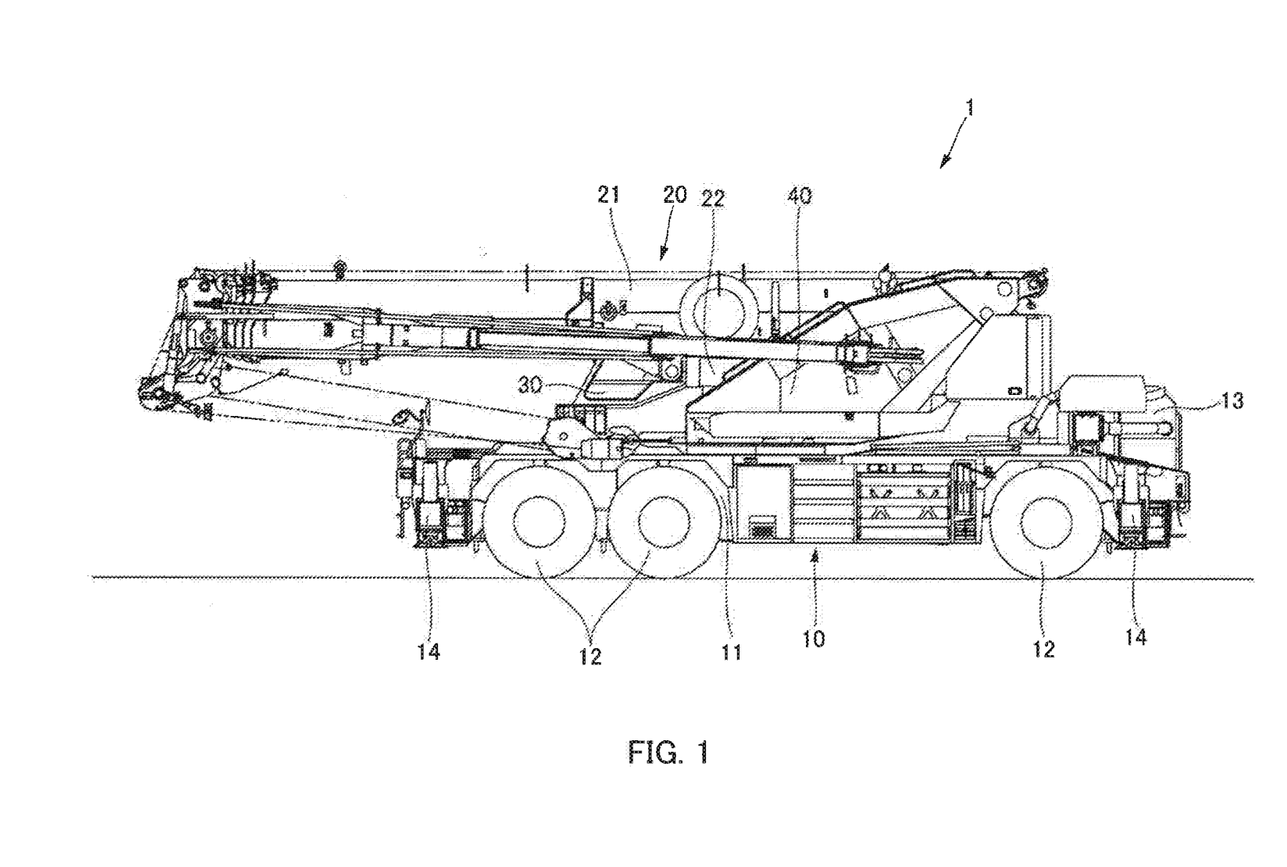
FIG. 1 is a side view of a mobile crane illustrating an embodiment of the present invention.

Mobile crane 1 as a work machine equipped with an erroneous forward/backward travelling operation notifying apparatus of the present invention includes vehicle body 10, crane apparatus 20, and cab 30. Vehicle body 10 travels on an ordinary road and in a working area. Crane apparatus 20 performs crane work. Cab 30 performs travel of vehicle body 10 and an operation of crane work by crane apparatus 20. Crane apparatus 20 and cab 30 are supported on rotating platform 40 rotatable in a horizontal direction with respect to vehicle body 10. Crane apparatus 20 is disposed on one side in a width direction of the rotating platform 40, whereas cab 30 is disposed on the other side in the width direction of the rotating platform.

Vehicle body 10 is a vehicle with three axels having two axels at a front side of carrier frame 11 extending in a longitudinal direction, and having one axle at a rear side of carrier frame 11. Wheels 12 are provided at both end portions of each of the axels. Vehicle body 10 travels by driving wheels 12 by power of engine 13. Engine 13 is provided at the rear side of carrier frame 11. Outriggers 14 are provided at both left and right sides in front of wheels 12 at a front side of carrier frame 11 and in rear of wheels 12 at the rear side.

Crane apparatus 20 has telescopic boom 21 that is provided to be capable of hoisting and lowering with respect to vehicle body 10. Telescopic boom 21 performs a hoisting and lowering motion by hydraulic hoisting and lowering cylinder 22. Telescopic boom 21 is capable of expansion and contraction. Telescopic boom 21 includes a telescopic mechanism constructed by a plurality of boom members that are formed in cylindrical shapes, and performs a telescopic motion by a hydraulic cylinder not illustrated.

A seat on which an occupant is seated, a steering wheel, operation levers, foot pedals and the like for travelling vehicle body 10 and crane work are to be provided inside cab 30. Mobile crane 1 travels with a front surface of cab 30 facing forward of vehicle body 10.

Mobile crane 1 includes power transmission apparatus 100 for transmitting power of engine 13 to wheels 12.

Figure 2:
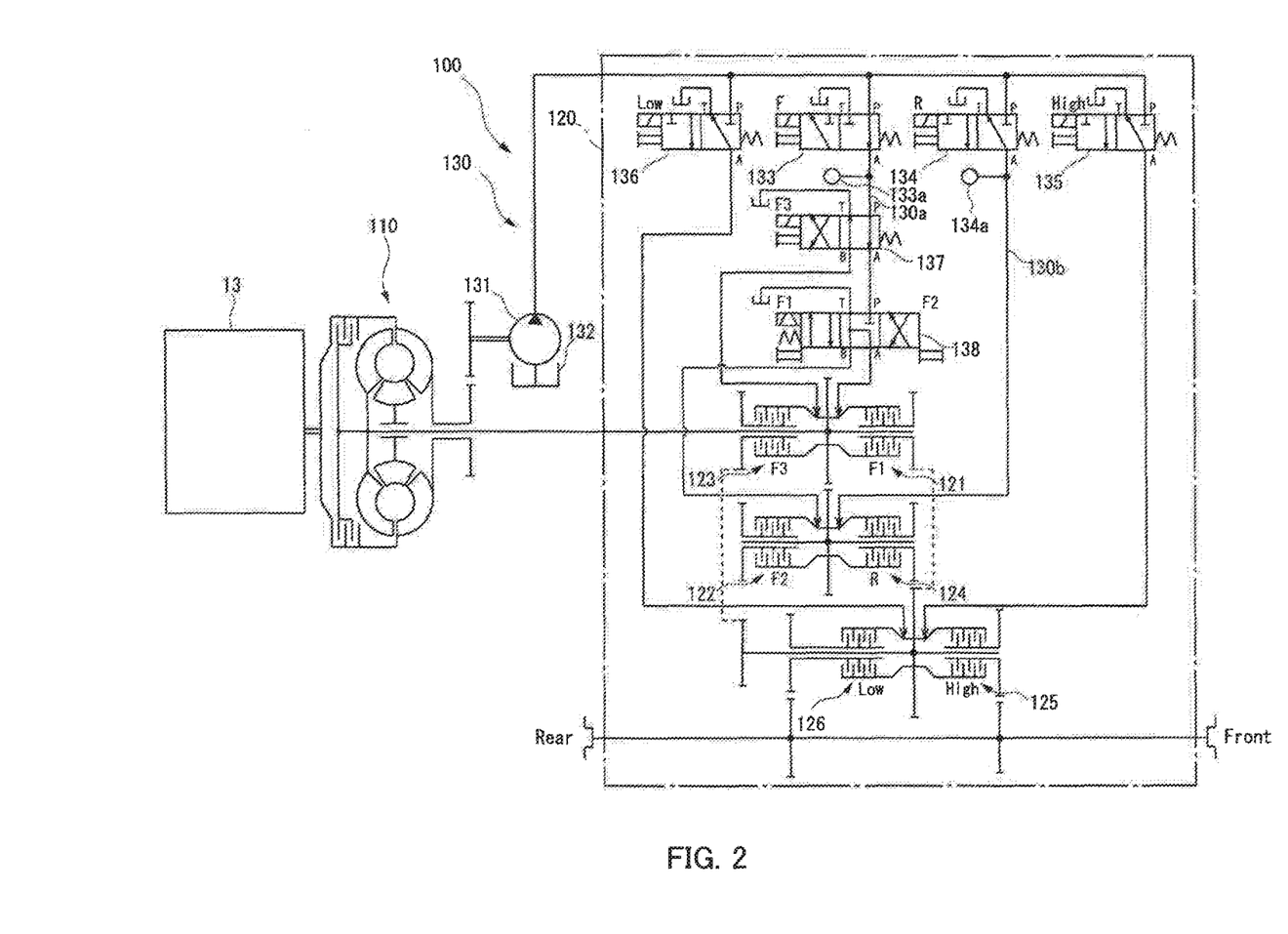
FIG. 2 is a schematic configuration diagram of a power transmission apparatus.

As illustrated in FIG. 2, power transmission apparatus 100 includes torque converter 110, transmission 120, and hydraulic oil circuit 130. Torque converter 110 amplifies torque of power that is outputted from engine 13. Transmission 120 converts a rotational speed and a rotation direction of power outputted from torque converter 110. Hydraulic oil circuit 130 performs an operation of switching a transmission gear ratio of transmission 120.

Torque converter 110 has a pump impeller, a turbine liner, and a stator. The power of engine 13 is directly transmitted to the pump impeller. The turbine liner rotates by an oil flow that is generated by rotation of the pump impeller, and transmits the power to the transmission. The stator rectifies the oil flow between the pump impeller and the turbine liner.

As illustrated in FIG. 2, transmission 120 has first to third forward travelling clutches 121, 122 and 123 (hereinafter, described as 121 to 123) for forward travelling that have different transmission gear ratios from one another, and backward travelling clutch 124 for reversing vehicle body 10. Transmission 120 converts the rotational speed and the rotation direction of the power outputted from torque converter 110, by bringing any one of first to third forward travelling clutches 121 to 123 and backward travelling clutch 124 into an engaged state, and bringing the other clutches into a disengaged state. Further, transmission 120 has high transmission gear ratio clutch 125 and low transmission gear ratio clutch 126 for switching the transmission gear ratio to two stages, in a state where each of first to third forward travelling clutches 121 to 123 and backward travelling clutch 124 is engaged. Accordingly, transmission 120 can switch the transmission gear ratio of six stages in a forward travelling direction, and can switch the transmission gear ratio of two stages in a backward travelling direction. Engagement and disengagement of each of clutches 121 to 126 are performed by the hydraulic oil supplied via hydraulic oil circuit 130.

As illustrated in FIG. 2, hydraulic oil circuit 130 has hydraulic pump 131, hydraulic oil tank 132, forward travel setting valve 133 (may be referred to as a "flow path switching mechanism"), backward travel setting valve 134 (may be referred to as a "flow path switching mechanism"), high transmission gear ratio setting valve 135, low transmission gear ratio setting valve 136, and first and second speed gear switching valves 137 and 138. Hydraulic pump 131 drives by the power of engine 13. Hydraulic oil tank 132 stores the hydraulic oil discharged by hydraulic pump 131. Forward travel setting valve 133 controls a flow of the hydraulic oil between hydraulic pump 131, and first to third forward travelling clutches 121 to 123 side. Backward travel setting valve 134 controls a flow of the hydraulic oil between hydraulic pump 131 and backward travelling clutch 124. High transmission gear ratio setting valve 135 controls a flow of the hydraulic oil between hydraulic pump 131 and high transmission gear ratio clutch 125. Low transmission gear ratio setting valve 136 controls a flow of the hydraulic oil between hydraulic pump 131 and low transmission gear ratio clutch 126. First and second speed gear switching valves 137 and 138 are provided for switching engagement to any one of first to third forward travelling clutches 121 to 123.

Forward travel setting valve 133 is a three-port single acting normally open electromagnetic valve.

Backward travel setting valve 134, high transmission gear ratio setting valve 135 and low transmission gear ratio setting valve 136 are respectively three-port single acting normally closed electromagnetic valves.

First speed gear switching valve 137 is a four-way four-port single acting electromagnetic valve.

Second speed gear switching valve 138 is a four-way four-port three-position electromagnetic valve, In the second speed gear switching valve 138, in a neutral position, port A and port B communicate with port T.

Here, a circuit configuration of hydraulic oil circuit 130 is described.

Hydraulic oil tank 132 is connected to a suction side of hydraulic pump 131. Respective ports P of forward travel setting valve 133, backward travel setting valve 134, high transmission gear ratio setting valve 135 and low transmission gear ratio setting valve 136 are connected to a discharge side of hydraulic pump 131 in parallel with one another. Port P of first speed gear switching valve 137 is connected to port A of forward travel setting valve 133. First pressure sensor 133a as a forward travelling pressure sensor is provided in forward travelling hydraulic oil flow path 130a between port A of forward travel setting valve 133 and port P of first speed gear switching valve 137. Backward travelling clutch 124 is connected to port A of backward travel setting valve 134. Second pressure sensor 134a as a backward travelling pressure sensor is provided in backward travelling hydraulic oil flow path 130b between port A of backward travel setting valve 134 and backward travelling clutch 124. High transmission gear ratio clutch 125 is connected to port A of high transmission gear ratio setting valve 135. Low transmission gear ratio clutch 126 is connected to port A of low transmission gear ratio setting valve 136. Port P of second speed gear switching valve 138 is connected to port A of first speed gear switching valve 137. Third forward travelling clutch 123 is connected to port B of first speed gear switching valve 137. First forward travelling clutch 121 is connected to port A of second speed gear switching valve 138. Second forward travelling clutch 122 is connected to port B of second speed gear switching valve 138.

Figure 3:
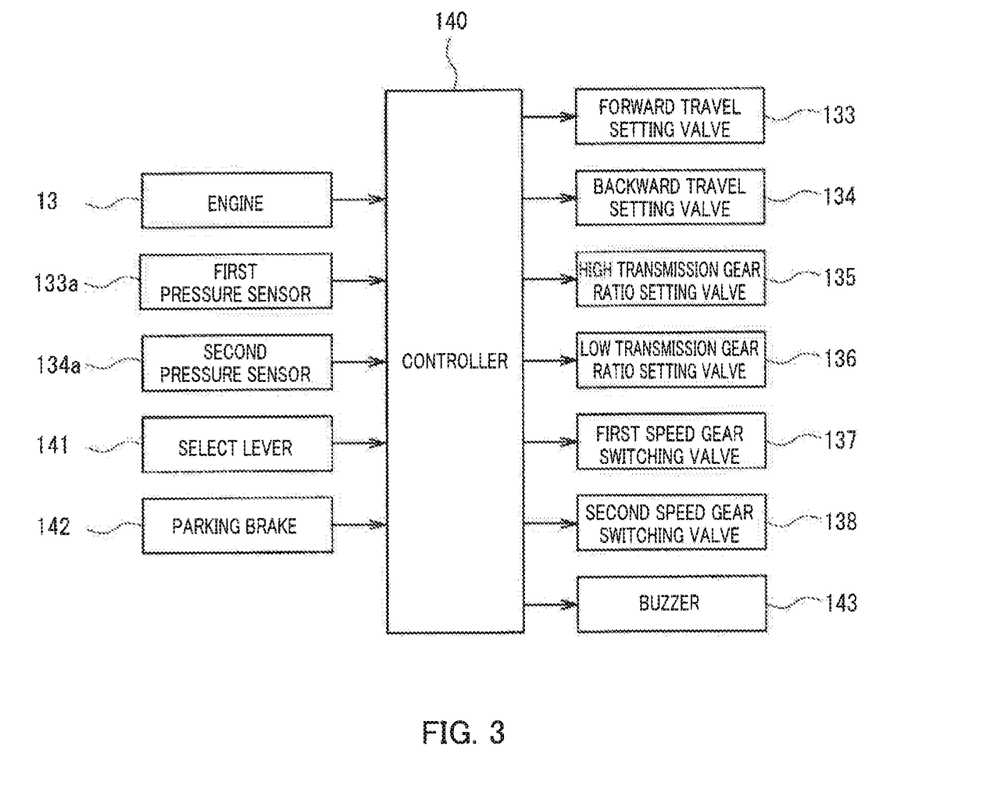
FIG. 3 is a block diagram illustrating a control system.

Mobile crane 1 includes controller 140 for controlling travel of vehicle body 10 and motion of crane apparatus 20.

Controller 140 has a CPU, ROM, RAM and/or the like. Controller 140 receives an input signal from an apparatus connected to an input side. The CPU reads a program stored in the ROM based on the input signal received by controller 140. The CPU also stores a state detected by the input signal in the RAM, and transmits an output signal to an apparatus connected to an output side.

As illustrated in FIG. 3, engine 13, first pressure sensor 133a, second pressure sensor 134a, select lever 141, and parking brake 142 are connected to the input side of controller 140. Select lever 141 is an operation input section for inputting setting of transmission 120. Parking brake 142 switches vehicle body 10 to a state incapable of travelling and a state capable of travelling.

As illustrated in FIG. 3, forward travel setting valve 133, backward travel setting valve 134, high transmission gear ratio setting valve 135, low transmission gear ratio setting valve 136, first speed gear switching valve 137, second speed gear switching valve 138 and buzzer 143 are connected to the output side of controller 140. Buzzer 143 is a notification section that notifies a worker of a predetermined state by sound.

When forward travel by vehicle body 10 is performed, in mobile crane 1 configured as above, the occupant drives engine 13, releases parking brake 142. The occupant then sets select lever 141, for example, at forward travel such as range D. Thereby, the flow path of forward travel setting valve 133 is brought into an open state in a state where the flow path of backward travel setting valve 134 is closed. In this state, the hydraulic oil discharged from hydraulic pump 131 flows to first to third forward travelling clutches 121 to 123 side, so that engagement of any one of first to third forward travelling clutches 121 to 123 is enabled. At this time, controller 140 operates first speed gear switching valve 137, second speed gear switching valve 138, high transmission gear ratio setting valve 135 and low transmission gear ratio setting valve 136. These operations by controller are based on setting of "Hi mode" or "Low mode" by the occupant, and conditions set in advance such as an engine speed, and travelling speed, for example. Thus, switching of first to third forward travelling clutches 121 to 123, and switching of high transmission gear ratio clutch 125 or low transmission gear ratio clutch 126 are performed.

When backward travelling by vehicle body 10 is performed, the occupant sets select lever 141 at backward travel in range R. Thereby, the flow path of backward travel setting valve 134 is brought into an open state in a state where the flow path of forward travel setting valve 133 is closed. In this state, the hydraulic oil discharged from hydraulic pump 131 flows to backward travelling clutch 124 side, so that backward travelling clutch 124 is engaged. At this time, controller 140 operates high transmission gear ratio setting valve 135 and low transmission gear ratio setting valve 136 based on setting of "Hi mode" or "Low mode" by the occupant. Thus, switching of high transmission gear ratio clutch 125 or low transmission gear ratio clutch 126 is performed.

When forward or backward travelling by vehicle body 10 is performed, controller 140 determines whether states of respective clutches 121 to 124 of transmission 120 are in a state of performing forward travelling or a state of performing backward travelling. When the states of respective clutches 121 to 124 do not coincide with the travel direction that is inputted to select lever 141, the controller 140 performs processing of notifying that an erroneous operation is to occur to a travelling direction of vehicle body 10. The processing by controller 140 is called erroneous forward/backward travelling operation notifying processing. An operation of the CPU of controller 140 is described with use of a flowchart in FIG. 4.

Figure 4:
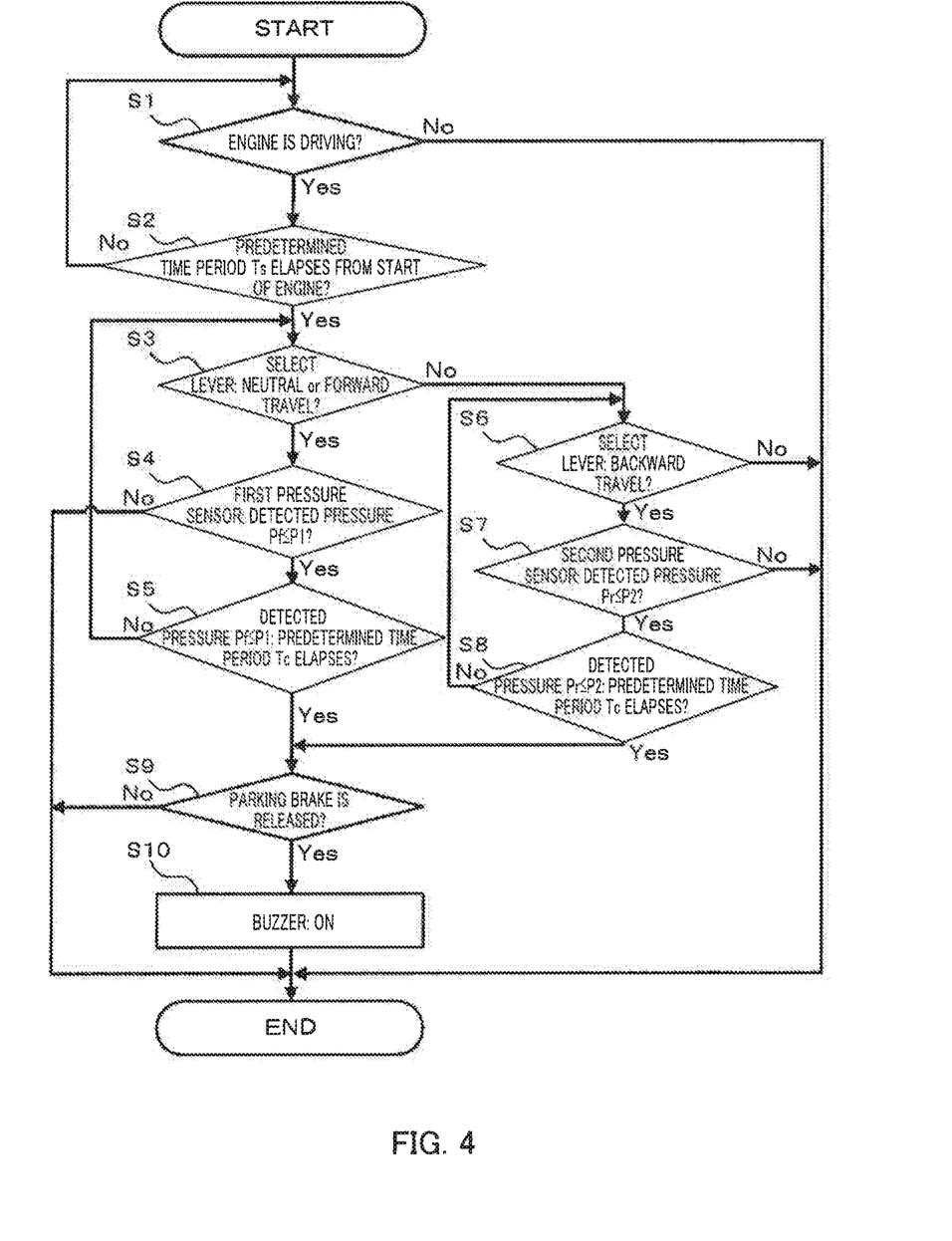
FIG. 4 is a flowchart of erroneous forward/backward travelling operation notification processing.

(Step S1)

In step S1, the CPU determines whether or not engine 13 is in a driving state (a so-called idle state). When the CPU determines that engine 13 is driving, the CPU causes processing to proceed to step S2. Whereas when the CPU does not determine that the engine 13 is driving, the CPU ends the erroneous forward/backward travelling operation notifying processing.

(Step S2)

When the CPU determines that engine 13 is driving in step S1, the CPU determines whether or not first predetermined time period Ts (for example, five seconds) or more elapses after engine 13 starts in step S2. When the CPU determines that first predetermined time period Ts or more elapses after engine 13 starts, the CPU causes processing to proceed to step S3, whereas when the CPU does not determine that first predetermined time period Ts or more elapses after engine 13 starts, the CPU returns processing to step S1.

(Step S3)

When the CPU determines that the first predetermined time period Ts or more elapses after the engine 13 starts in step S2, the CPU determines whether or not select lever 141 is set at neutral or forward travel such as range N or range D, for example, in step S3.

When the CPU determines that select lever 141 is set at neutral or forward travel, the CPU causes processing to proceed to step S4, whereas when the CPU does not determine that select lever 141 is set at neutral or forward travel, the CPU causes processing to proceed to step S6.

(Step S4)

When the CPU determines that select lever 141 is set at neutral or forward travel in step S3, the CPU determines whether or not detected pressure Pf of first pressure sensor 133a is at first predetermined pressure P1 (for example, 0.93 MPa) or less (Pf≤P1) in step S4. When the CPU determines that detected pressure Pf of first pressure sensor 133a is at first predetermined pressure P1 or less, the CPU causes processing to proceed to step S5, whereas when the CPU does not determine that detected pressure Pf of first pressure sensor 133a is at first predetermined pressure P1 or less, the CPU ends the erroneous forward/backward travelling operation notification processing.

Here, the state where detected pressure Pf of first pressure sensor 133a is at first predetermined pressure P1 or less shows a state where the pressure of forward travelling hydraulic oil flow path 130a in hydraulic oil circuit 130 is at first predetermined pressure P1 or less. This state shows that there is a possibility of none of first to third forward travelling clutches 121 to 123 being engaged although select lever 141 is set at forward travel.

(Step S5)

When the CPU determines that detected pressure Pf of first pressure sensor 133a is at first predetermined pressure P1 or less in step S4, the CPU determines whether or not the state where detected pressure Pf of first pressure sensor 133*a* is at first predetermined pressure P1 or less continues for second predetermined time period Tc (for example, three seconds) or more in step S5. When the CPU determines that the state where detected pressure Pf of first pressure sensor 133*a* is at first predetermined pressure P1 or less continues for second predetermined time period Tc or more, the CPU causes processing to proceed to step S9, whereas when the CPU does not determine that the state where detected pressure Pf of first pressure sensor 133*a* is at first predetermined pressure P1 or less continues for second predetermined time period Tc or more, the CPU returns processing to step S3.

(Step S6)

When the CPU does not determine that select lever 141 is set at neutral or forward travel in step S3, the CPU determines whether or not select lever 141 is set at backward travel that is range R in step S6. When the CPU determines that select lever 141 is set at backward travel, the CPU causes processing to proceed to step S7, whereas when the CPU does not determine that select lever 141 is set at backward travel, the CPU ends the erroneous forward/backward travelling operation notification processing.

(Step S7)

When the CPU determines that select lever 141 is set at backward travel in step S6, the CPU determines whether or not detected pressure Pr of second pressure sensor 134*a* is at second predetermined pressure P2 (for example, 0.93 MPa) or less (Pr≤P2) in step S7. When the CPU determines that detected pressure Pr of second pressure sensor 134*a* is at second predetermined pressure P2 or less, the CPU causes processing to proceed to step S8, whereas when the CPU does not determine that detected pressure Pr of second pressure sensor 134*a* is at second predetermined pressure P2 or less, the CPU ends the erroneous forward/backward travelling operation notification processing.

Here, the state where detected pressure Pr of second pressure sensor 134*a* is at second predetermined pressure P2 or less shows a state where the pressure of backward travelling hydraulic oil flow path 130*b* in hydraulic oil circuit 130 is at second predetermined pressure P2 or less. This state shows that there is a possibility that backward travelling clutch 124 is not engaged although select lever 141 is set at backward travel.

(Step S8)

When the CPU determines that detected pressure Pr of second pressure sensor 134*a* is at second predetermined pressure P2 or less in step S7, the CPU determines whether or not the state where detected pressure Pr of second pressure sensor 134*a* is at second predetermined pressure P2 or less continues for second predetermined time period Tc (for example, three seconds) or more in step S8. When the CPU determines that the state where detected pressure Pr of second pressure sensor 134*a* is at second predetermined pressure P2 or less continues for second predetermined time period Tc or more, the CPU causes processing to proceed to step S9, whereas when the CPU does not determine that the state where detected pressure Pr of second pressure sensor 134*a* is at second predetermined pressure P2 or less continues for second predetermined time period Tc or more, the CPU returns processing to step S6.

(Step S9)

When the CPU determines that the state where detected pressure Pf of first pressure sensor 133*a* is at first predetermined pressure P1 or less continues for second predetermined time period Tc or more in step S5, or when the CPU determines that the state where detected pressure Pr of second pressure sensor 134*a* is at second predetermined pressure P2 or less continues for second predetermined time period Tc or more in step S8, the CPU determines whether or not parking brake 142 is released in step S9. When the CPU determines that parking brake 142 is released, the CPU causes processing to proceed to step S10, whereas when the CPU does not determine that parking brake 142 is released, the CPU ends the erroneous forward/backward travelling operation notification processing.

(step S10)

When the CPU determines that parking brake 142 is released in step S9, the CPU turns on the buzzer to end erroneous forward/backward travelling operation notification processing in step S10.

In this way, the work-machine erroneous forward/backward travelling operation notifying apparatus of the present embodiment determines whether or not the states of clutches 121 to 124 coincide with the travel direction inputted to select lever 141, based on detected pressure Pf of first pressure sensor 133*a* or detected pressure Pr of second pressure sensor 134*a* and the travel direction inputted to select lever 141. When determining that the states of clutches 121 to 124 do not coincide with the travel direction inputted to select lever 141, the work-machine erroneous forward/backward travelling operation notifying apparatus notifies that an erroneous operation is to occur to vehicle body 10.

Thereby, it becomes possible to cause the occupant to recognize that an erroneous operation is to occur to vehicle body 10 before vehicle body 10 actually starts to travel. As a result, it becomes possible to enhance safety in the travelling time of vehicle body 10.

The work-machine erroneous forward/backward travelling operation notifying apparatus suspends notification by buzzer 143 until second predetermined time period Tc elapses after the states of clutches 121 to 124 do not coincide with the travel direction inputted to select lever 141.

Thereby, the buzzer 143 can be prevented from sounding by a fluctuation in the pressure of forward travelling hydraulic oil flow path 130*a* and backward travelling hydraulic oil flow path 130*b* immediately after forward travel setting valve 133 and backward travel setting valve 134 are switched. As a result, it becomes possible to perform notification by buzzer 143 only when an erroneous operation actually occurs.

When parking brake 142 makes vehicle body 10 incapable of travelling in the state where the states of clutches 121 to 124 do not coincide with the travel direction inputted to select lever 141, the work-machine erroneous forward/backward travelling operation notifying apparatus suspends notification by buzzer 143.

Thereby, buzzer 143 can be prevented from sounding except for the case in which the occupant actually performs an operation of starting travel by vehicle body 10. As a result, buzzer 143 can be prevented from sounding needlessly.

When neutral or a forward travel direction is inputted to select lever 141, and detected pressure Pf of first pressure sensor 133*a* is at first predetermined pressure P1 or less, the work-machine erroneous forward/backward travelling operation notifying apparatus determines that the states of clutches 121 to 124 do not coincide with the travel direction inputted to select lever 141, and when a backward travel direction is inputted to select lever 141 and detected pressure Pr of second pressure sensor 134*a* is at second predetermined pressure P2 or less, the work-machine erroneous forward/backward travelling operation notifying apparatus determines that the states of clutches 121 to 124 do not coincide with the travel direction inputted to select lever 141.

Thereby, it becomes possible to determine that the states of clutches 121 to 124 do not coincide with the travel direction inputted to select lever 141 by a simple configuration, so that manufacturing cost can be reduced.

The work-machine erroneous forward/backward travelling operation notifying apparatus notifies that an erroneous operation is to occur to vehicle body 10 by buzzer 143.

Thereby, occurrence of an erroneous operation of vehicle body 10 can be reliably notified to the occupant by the sound of buzzer 143. As a result, it becomes possible to enhance safety.

The work-machine erroneous forward/backward travelling operation notifying apparatus according to the embodiment determines that the states of clutches 121 to 124 do not coincide with the travel direction inputted to select lever 141 when neutral or a forward travel direction is inputted to select lever 141, and detected pressure Pf of first pressure sensor 133a is at first predetermined pressure P1 or less. Meanwhile, the work-machine erroneous forward/backward travelling operation notifying apparatus according to the embodiment determines that the states of clutches 121 to 124 do not coincide with the travel direction inputted to select lever 141 when a backward travel direction is inputted to select lever 141, and detected pressure Pr of second pressure sensor 134a is at second predetermined pressure P2 or less. Although a description has been given, in the above embodiment, of the work-machine erroneous forward/backward travelling operation notifying apparatus having the configuration described above, the application target of the present invention is not limited to this.

For example, the present invention is applicable to a work-machine erroneous forward/backward travelling operation notifying apparatus of variation 1 below. When neutral or a forward travel direction is inputted to select lever 141, and detected pressure Pr of second pressure sensor 134a is at a predetermined pressure or more, the work-machine erroneous forward/backward travelling operation notifying apparatus according to variation 1 determines that the states of clutches 121 to 124 do not coincide with the travel direction inputted to select lever 141. When a backward travel direction is inputted to select lever 141, and detected pressure Pf of first pressure sensor 133a is at a predetermined pressure or more, the work-machine erroneous forward/backward travelling operation notifying apparatus according to variation 1 determines that the states of clutches 121 to 124 do not coincide with the travel direction inputted to select lever 141, Further, the present invention is applicable to a work-machine erroneous forward/backward travelling operation notifying apparatus of variation 2 below. When neutral or a forward travel direction is inputted to select lever 141, and detected pressure Pf of first pressure sensor 133a is smaller than detected pressure Pr of second pressure sensor 134a, the work-machine erroneous forward/backward travelling operation notifying apparatus according to variation 2 determines that the states of clutches 121 to 124 do not coincide with the travel direction inputted to select lever 141, Meanwhile, when a backward travel direction is inputted to select lever 141, and detected pressure Pr of second pressure sensor 134a is smaller than detected pressure Pf of first pressure sensor 133a, the work-machine erroneous forward/backward travelling operation notifying apparatus according to variation 2 determines that the states of clutches 121 to 124 do not coincide with the travel direction inputted to select lever 141.

While in the embodiment, the work machine to which mobile crane 1 is applied is shown as a work machine, the present invention is also applicable to a work machine such as an excavating machine, as long as it is the work machine equipped with a transmission that switches a clutch by hydraulic pressure or pneumatic pressure.

While in the embodiment, the apparatus which notifies that the states of clutches 121 to 124 do not coincide with the travel direction inputted to select lever 141 by buzzer 143 is shown, the present invention is not limited to this. For example, the above fact may be displayed on a display section such as a liquid crystal display, or a lamp such as LED displaying the fact may be lit.

REFERENCE SIGNS LIST

1 Mobile crane
10 Vehicle body
100 Power transmission apparatus
120 Transmission
121 First forward travelling clutch
122 Second forward travelling clutch
123 Third forward travelling clutch
124 Backward travelling clutch
130 Hydraulic oil circuit
130a Forward travelling hydraulic oil flow path
130b Backward travelling hydraulic oil flow path
133 Forward travel setting valve
133a First pressure sensor
134 Backward travel setting valve
134a Second pressure sensor
141 Select lever
142 Parking brake
143 Buzzer

The invention claimed is:
1. A work-machine erroneous forward/backward travelling operation notifying apparatus, comprising:
    a transmission including a clutch that performs switching of forward travel or backward travel of a travelling body by a hydraulic oil discharged from a hydraulic pump;
    a forward travelling hydraulic oil flow path that allows the hydraulic oil to flow through when the clutch is set at a forward travel side of the travelling body;
    a backward travelling hydraulic oil flow path that allows the hydraulic oil to flow through when the clutch is set at a backward travel side of the travelling body;
    a flow path switching mechanism that switches a flow path for the hydraulic oil discharged from the hydraulic pump to a forward travelling hydraulic oil flow path side or a backward travelling hydraulic oil flow path side;
    a forward travelling pressure sensor that detects pressure in the forward travelling hydraulic oil flow path;
    a backward travelling pressure sensor that detects pressure in the backward travelling hydraulic oil flow path;
    an operation input section that inputs an operation that causes the travelling body to travel forward or travel backward;
    a state determination section that determines whether or not a state of the clutch coincides with a travel direction inputted to the operation input section, based on at least one of detected pressure of the forward travelling pressure sensor and detected pressure of the backward travelling pressure sensor and the travel direction inputted to the operation input section; and a notification section that notifies, before the travelling body starts to travel, that an erroneous operation is to occur on the travelling body, when it is determined that the state of the clutch does not coincide with the travel direction inputted to the operation input section by the state determination section.

2. The work-machine erroneous forward/backward travelling operation notifying apparatus according to claim 1, further comprising determination start time notification suspending section that suspends notification by the notification section until a predetermined time period elapses after it is determined that the state of the clutch does not coincide with the travel direction inputted to the operation input section by the state determination section.

3. The work-machine erroneous forward/backward travelling operation notifying apparatus according to claim 1, further comprising:

a parking brake that brings the travelling body into a state incapable of travelling; and a non-travelling time notification suspending section that suspends notification by the notification section, when the parking brake is in such a state that the parking brake makes the travelling body incapable of travelling in a state where it is determined that the state of the clutch does not coincide with the travel direction inputted to the operation input section by the state determination section.

4. The work-machine erroneous forward/backward travelling operation notifying apparatus according to claim 1, wherein:

the state determination section determines that the state of the clutch does not coincide with the travel direction inputted to the operation input section, when the travel direction inputted to the operation input section is forward, and the detected pressure of the forward travelling pressure sensor is at a first predetermined pressure or less, and determines that the state of the clutch does not coincide with the travel direction inputted to the operation input section, when the travel direction inputted to the operation input section is backward, and the detected pressure of the backward travelling pressure sensor is at a second predetermined pressure or less.

5. The work-machine erroneous forward/backward travelling operation notifying apparatus according to claim 1, wherein:

the notification section notifies that an erroneous operation is to occur on the travelling body by a buzzer.

* * * * *